(12) United States Patent
Viikki

(10) Patent No.: US 6,944,277 B1
(45) Date of Patent: Sep. 13, 2005

(54) TEXT-TO-SPEECH AND MIDI RINGING TONE FOR COMMUNICATIONS DEVICES

(75) Inventor: Olli Viikki, Nokia (FI)

(73) Assignee: Nokia Corporation, Espoo (FI)

( * ) Notice: Subject to any disclaimer, the term of this patent is extended or adjusted under 35 U.S.C. 154(b) by 3 days.

(21) Appl. No.: 10/789,369

(22) Filed: Feb. 26, 2004

(51) Int. Cl.[7] .................. H04M 1/56; H04M 15/06; H04M 3/00; H04M 3/42; H04M 1/00
(52) U.S. Cl. .................. 379/142.06; 379/142.01; 379/373.02; 379/373.03; 379/374.01; 379/374.02; 455/415; 455/567
(58) Field of Search .................. 379/114.01, 142.04, 379/142.06, 88.11, 93.23, 373.01, 373.02, 379/373.03, 373.04, 374.01, 374.02, 418; 455/415, 567

(56) References Cited

U.S. PATENT DOCUMENTS

| | | | |
|---|---|---|---|
| 5,559,860 A | * | 9/1996 | Mizikovsky ............... 455/413 |
| 5,805,677 A | * | 9/1998 | Ferry et al. ............... 379/93.35 |
| 6,094,587 A | * | 7/2000 | Armanto et al. ........... 455/567 |
| 6,549,767 B1 | * | 4/2003 | Kawashima ............... 455/412.2 |
| 6,597,928 B2 | * | 7/2003 | Ito ............................ 455/567 |
| 6,636,602 B1 | * | 10/2003 | Vlacancich ............... 379/374.01 |
| 6,697,470 B2 | * | 2/2004 | McDonough ............. 379/142.01 |
| 2005/0063532 A1 | * | 3/2005 | Kim .......................... 379/373.01 |

* cited by examiner

Primary Examiner—Quoc Tran
(74) Attorney, Agent, or Firm—Ware, Fressola, Van Der Sluys & Adolphson LLP

(57) ABSTRACT

A method and device for providing a mixed audible signal which includes a ringing tone and the identity of a calling party upon receiving the incoming call of the calling party. The incoming call can be a voice call, a call to convey an MMS message, or a call to convey an SMS message. A TTS synthesizer is used to generate sounds representative of the text identifying the caller if the identity can be found in a caller ID database. A MIDI protocol is used to generate a ringing tone of one or more musical note sequences. A combining module is used to integrate the TTS message and the MIDI tone into the mixed audible signal. Whether only the ringing tone or the mixed audible signal is played is selectable based on a use profile of the device.

27 Claims, 3 Drawing Sheets

TEXT-TO-SPEECH AND MIDI RINGING TONE FOR COMMUNICATIONS DEVICES

FIELD OF THE INVENTION

The present invention relates generally to a communications device, such as a telephone set and, more particularly, to a ringing tone and a caller ID for communications devices.

BACKGROUND OF THE INVENTION

It is known in the art that when a mobile phone receives a phone call, it provides a ringing tone to notify the call to the phone user. In addition, the name of the calling party, if known, may be displayed on the display screen of the mobile phone. In order to find out the identity of the calling party, the phone user must take a look at the screen. However, when the called party is not in the proximity of the mobile phone, or the called party is driving an automobile, for example, finding out the identity of the calling party would be inconvenient.

It is advantageous and desirable to provide a method for finding out the identity of the calling party without seeing the displayed name.

SUMMARY OF THE INVENTION

The present invention uses the TTS (Text-to-Speech) and MIDI (Musical Instrument Digital Interface) modules to generate a ringing tone that can audibly reveal the identity of the calling party.

The first aspect of the present invention provides a method of informing a user of a communications device regarding an identity of a calling party making an incoming communication event to the communications device. The method comprises:
  synthesizing a waveform signal indicative of at least a part of the caller's identity;
  combining the synthesized signal with a further signal indicative of one or more musical notes for providing a mixed signal; and
  producing an audible message indicative of the mixed signal to inform the user regarding the caller's identity.

According to the present invention, the incoming communication event can be a voice call, a call to convey a text message such as an SMS message, or a call to convey a multimedia messaging service (MMS) message.

According to the present invention, the waveform signal includes a text-to-speech message, and the further signal is indicative of a ringing tone with a sequence of musical notes, which may have a monotone sub-sequence. The musical note sequence can be played before or after the text-to-speech message or both.

According to the present invention, the communications device has a first use profile and a second use profile to allow the user to select one of the profiles such that when the first use profile is selected, the audible message is indicative of the mixed signal, and when the second use profile is selected, the audible message is only a ringing tone.

The second aspect of the present invention provides a communications device for receiving an incoming communication event from a calling party having an identity. The device comprises:
  a synthesizing module for providing a synthesized waveform signal indicative of the identity of the calling party;
  a combining module, responsive to the synthesized waveform signal, for providing a mixed signal including the waveform signal and a further waveform signal indicative of one or more musical notes; and
  a sound producing module, responsive to a mixed signal, for producing an audible message indicative of the synthesized waveform signal and the further waveform signal upon receiving the incoming communication.

According to the present invention, the synthesized waveform signal comprises a text-to-speech message, and the combining module comprises a musical-instrument digital interface (MIDI) protocol for producing the further waveform signal.

According to the present invention, the mixed signal has a format, and the communications device further comprises a plurality of control parameters to define the format. The control parameters include a beginning sequence time to define the length over which the musical notes in the beginning note sequence are played prior to the text-to-speech message; an end sequence time to define the length over which the musical notes in the end note sequence are played after the text-to-speech message, and a petition time to control the number of times the text-to-speech message is played.

The communications device can be a mobile terminal or the like.

The third aspect of the present invention provides a software product for use in a communications device, wherein the communications device is capable of receiving an incoming communication event from a calling party having an identity and wherein the communications device comprises a database; and a sound producing device. The software product comprises:
  a first code, responsive to the incoming communication event, for finding the identity of the calling party in the database; and
  a second code for combining a first waveform signal indicative of one or more musical notes and a second waveform signal indicative of the identity of the calling party for providing a mixed signal so as to allow the sound producing device to produce an audible message based on the mixed signal to inform a user of the communications device regarding the caller's identity, if the identity is found in the database.

According to the present invention, the communications device includes a ringing tone database, and the software product further comprises a third code for providing the first waveform signal based on a ringing tone format in the ringing tone database, a fourth code for providing the second waveform signal based on the identity of the calling party found in the database.

According to the present invention, the sound producing device produces a different audible message based on the first waveform if the first code fails to find the identity of the calling party in the database.

The present invention will become apparent upon reading the description taken in conjunction with FIGS. 1–3.

DETAILED DESCRIPTION OF THE INVENTION

The present invention combines the TTS (Text-to-Speech) and MIDI (Musical Instrument Digital Interface) technologies for generating a ringing tone that can audibly reveal the identity of the calling party. A TTS synthesizer is a computer-based system that generates sounds representative of the text provided to the system. In the present invention, TTS is used to synthesize sounds resembling the name of a calling party or the telephone number of the calling party who makes a voice call to a telephone.

The MIDI standard defines a communications protocol between electronic musical devices. In general, essentially MIDI is concerned with transferring information from a control device about which notes are to be played to a sound generator where the sounds of the notes are synthesized. MIDI is generally used to generate a ringing tone in a mobile phone, for example.

TTS and MIDI technologies are known in the art and, therefore, are beyond the scope of the present invention.

The present invention uses both TTS and MIDI technologies to provide a method and device for generating a mixed ringing tone for a mobile terminal, for example, to inform the phone users of the incoming calls. The mixed ringing tones are able to inform the user about the identity of the calling party so that the user does not need to look at the information displayed on the screen of the mobile phone to find out who is calling. Because the mixed ringing tone contains a synthesized sound announcing the name or the telephone number of the calling party and one or more melodies, the mixed ringing tone is both informative and entertaining.

The conventional ringing tones are static in that they are based on a predetermined sequence of notes even when the sequence can be selected from a database. The integration of TTS enables the generation of dynamic ringing tones that provide some useful information to the end-user. In a hands free usage situation (with a headset or in the car environment, for example), the end user does not need to look at the display screen of the telephone set in order to check the caller's identity.

Figure 1:
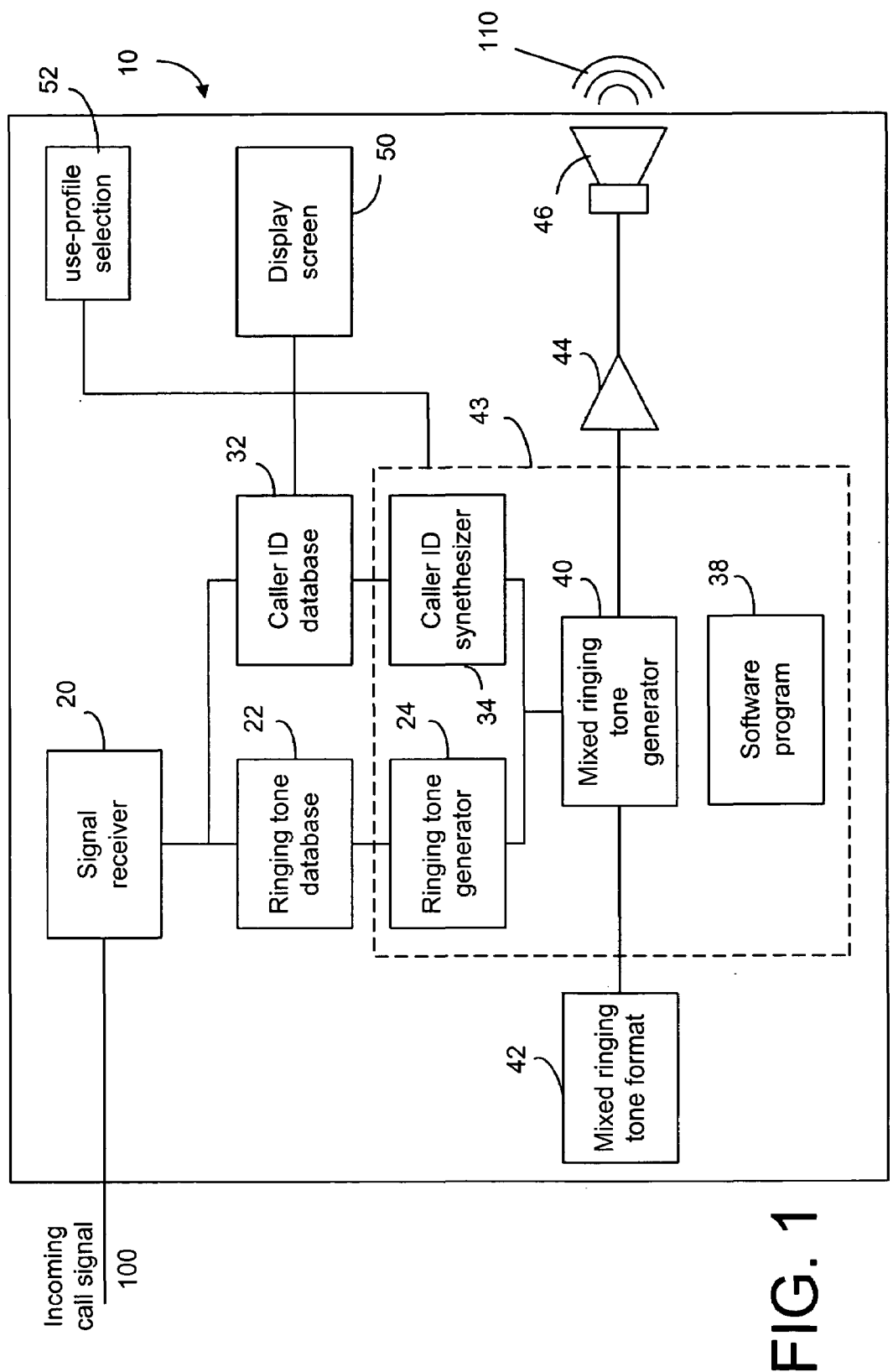
FIG. 1 is a block diagram illustrating a communications device for receiving caller's messages, according to the present invention.

FIG. 1 is a block diagram showing some components in a communications device, such as a mobile terminal 10, which can be used to reveal the caller's identity. As shown in the figure, the mobile terminal 10 comprises a signal receiver 20 to receive an incoming call signal. Upon receiving such a signal, a musical note sequence is retrieved from a ringing tone database 22, which contains one predetermined note sequence or a plurality of note sequences. A ringing tone generator 24 uses a MIDI protocol or the like to generate a waveform sequence indicative of the retrieved note sequence. The mobile terminal 10 also checks the phone number of calling party in a contacts database 32. If the name of the calling party can be found in the contacts database 32, a part of the name or the entire name is synthesized from text into a waveform by a sound synthesizer, such as a TTS engine 34. If the name of the calling party is not found, then a part of the phone number of the calling party or the entire phone number is synthesized into a waveform by the sound synthesizer 34 in order to produce a message or announcement such as "Timo calling", "Timo Sibelius calling", "6294 calling", "Timo at 6294 calling", "the caller's number is 902-203-1234", or the variation thereof. A mixing module 40 is then used to combine the waveform of the musical note sequence and the waveform indicative of the caller's identity into a mixed waveform. Through an amplification module 44, the mixed ringing tone is produced by the sound-producing device 46 based on the mixed waveform. The sound produced by the sound-producing device is denoted by reference numeral 110.

The outputted ringing tone can be controlled by a number of ringing tone parameters as shown below:

1. Beginning Melody Time—this parameter controls the length over which the musical note sequence generated by MIDI is played before the synthetic (TTS) message is included;
2. End Melody Time—once the name or phone number has been announced, this parameter controls how long the MIDI tone is played until the name or number is synthesized again;
3. Volume Control—when both the MIDI tone and the TTS message are played in a sequence, this parameter controls what is the volume of the MIDI tone and what is the volume of the TTS message. For example, it is possible to reduce the volume of the MIDI in order to emphasize the TTS message; and
4. TTS repetition—this parameter controls the number of times the TTS message is played. For example, the TTS message can be played once, twice or more times upon receiving an incoming call.

These parameters can be stored in a module 42, and may be modified by the end-user of the mobile terminal 10. The identity of the calling party can also be displayed on the display screen 50 in addition to the audible announcement.

It should be noted that the MIDI tone played as the beginning melody can be the same as the MIDI tone played as the end melody, but they can also be different. The TTS message and the MIDI tone can be played in a non-overlapping fashion, partially overlapping fashion or a totally overlapping fashion. Furthermore, the communications device 10, as depicted in FIG. 1, can be a mobile terminal, but it can also be a communicator device, a personal digital assistant (PDA) with wireless communication capability, or a similar device for communication purposes.

Figure 2:
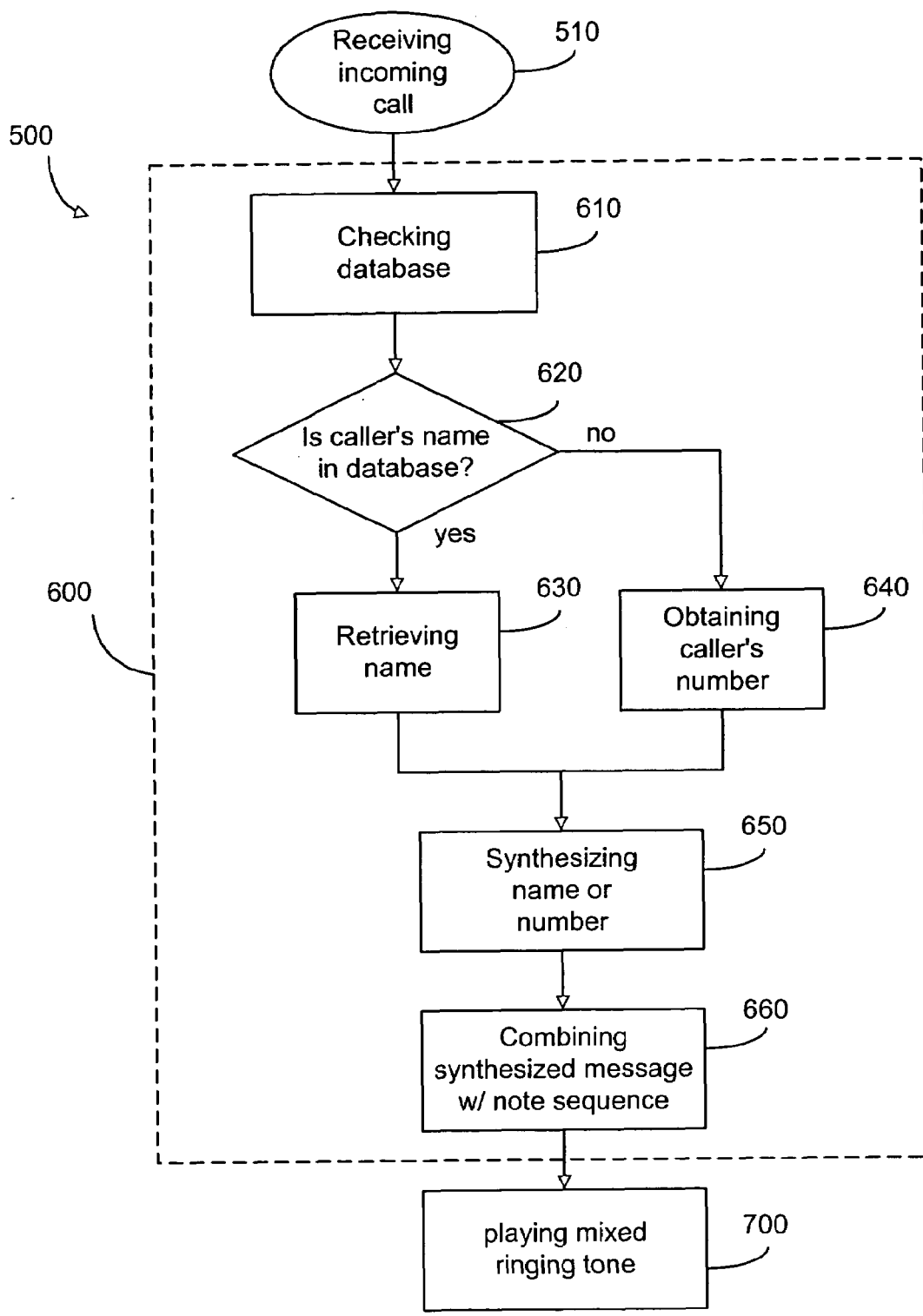
FIG. 2 is a flowchart illustrating the method of generating a mixed ringing tone, according to the present invention.

FIG. 2 shows a flowchart illustrating the method of generating a mixed ringing tone, according to an embodiment of the present invention. As shown in the flowchart 500, after a telephone set 10 receives an incoming call at step 510, it checks the database at step 610 for the caller's identity based on the caller's phone number. If the database 32 contains the name of the caller as determined at step 620, the name is retrieved at step 630. If the database 32 does not contain the name of the caller, the telephone number of the caller is obtained at step 640 from the incoming call and used instead. A part or the entire name, or telephone number is synthesized using a TTS module 34 in the telephone set 10 at step 650. At step 660, the mixing module 40 is used to combine the TTS message and the musical note sequence into a mixed sequence as determined by the ringing tone parameters. The mixed ringing tone (TTS-MIDI ringing tone) is played at step 700 until the end of the sequence or the interruption by the end-user. The steps 610 to 660 are collectively referred to as step 600 in FIG. 3.

Figure 3:
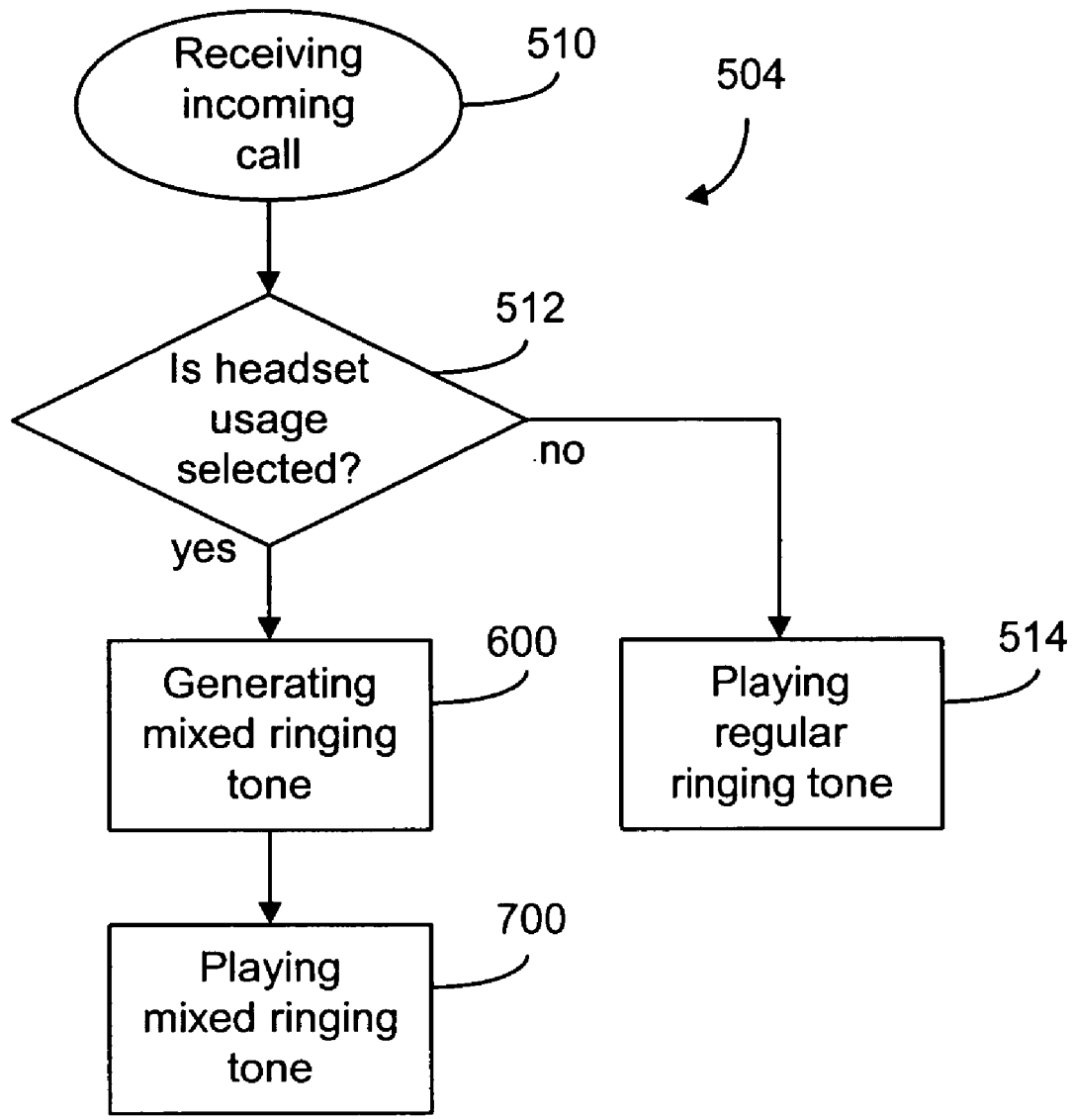
FIG. 3 is a flowchart illustrating the options in producing a ringing tone.

The TTS-MIDI ringing tone, according to the present invention, can be implemented with certain use profiles of the mobile phone. For example, if a headset use profile or a car profile is selected, then the TTS-MIDI ringing tone is played so that the phone user does not have to look at the display to find out who the caller is. Otherwise, a conventional ringing tone can be played. It is advantageous that the use profiles can be selected by the end-user, for example, by changing the ringing tone parameters in the module 42 (see FIG. 1). The use profile selection can be carried out via a use-profile selection switch or button 52, for example. The above-disclosed headset usage is illustrated in the flowchart 504 of FIG. 3. As shown in FIG. 3, the incoming call is received at step 510. If it is determined at step 512 that the headset usage is selected, then the mixed ringing tone is generated at step 600 and played at step 700. If the headset usage is not selected, then a regular ringing tone is played at step 514.

The present invention is useful in informing the end-user of a mobile phone regarding the identity of a calling party who makes a voice call. The present invention can also be used to inform the end-user regarding the identity of a calling party who leaves a text message, such as a message in a short message service (SMS), or conveys a message in a multimedia message service (MMS), containing text and audio. In the latter case, it is possible to incorporate part of the audio message into the mixed ringing tone.

It should be noted that FIG. 1 is for illustration purposes only. The communications device 10 in FIG. 1 is depicted as having various separate modules to carry out various functions, some of these modules can be combined or share an electronic circuit. Some of the functions can be carried out by hardware and some by software. For example, the ringing tone generator 24, the sound synthesizer 34 and the mixed ringing tone generator 40 can be combined in an integrated sound generating module 43. A software program 38 can be implemented in the module 43 to carry out one or more of the ringing tone generation, MIDI synthesizer and sounding mixing functions. For example, the software program may comprise a first code, responsive to the incoming communication event, for finding the identity of the calling party in the database; and a second code for combining a first waveform signal indicative of one or more musical notes and a second waveform signal indicative of the identity of the calling party for providing a mixed signal so as to allow the sound producing device to produce an audible message based on the mixed signal to inform a user of the communications device the caller's identity, if the identity is found in the database. The software program may also comprise a third code for providing the first waveform signal based on a ringing tone format in the ringing tone database, and a fourth code for providing the second waveform signal based on the identity of the calling party found in the database.

The ringing tone can be a monotone sequence, a sequence of different musical notes or the combination thereof. The ringing tone can be played before the text-to-speech message, after the text-to-speech message or both before and after the text-to-speech message. The ringing tone and the text-to-speech message can be repeated, if so desired.

Although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A method of informing a user of a communications device regarding an identity of a calling party making an incoming communication event to the communications device, said method comprising:
    synthesizing a waveform signal indicative of at least a part of the caller's identity;
    combining the synthesized signal with a further signal indicative of one or more musical notes for providing a mixed signal; and
    producing an audible message indicative of the mixed signal to inform the user regarding the caller's identity.

2. The method of claim 1, wherein the incoming communication event comprises a voice call.

3. The method of claim 1, wherein the incoming communication event comprises a call to convey a text message.

4. The method of claim 3, wherein the message is a short message service (SMS) message.

5. The method of claim 3, wherein the call further conveys an audio message.

6. The method of claim 5, wherein the text and audio message is a multimedia messaging service (MMS) message.

7. The method of claim 1, wherein the waveform signal comprising a text-to-speech message.

8. The method of claim 1, wherein the further signal is indicative of a ringing tone with a sequence of musical notes.

9. The method of claim 8, wherein the sequence contains at least a monotone sub-sequence.

10. The method of claim 7, wherein the further signal is indicative of a ringing tone audibly produced prior to the text-to-speech message.

11. The method of claim 7, wherein the further signal is further indicative of a sequence of musical notes audibly produced after the text-to-speech message.

12. The method of claim 1, wherein the communications device has a first use profile and a second use profile, the method further comprising:
    selecting one of the first and second use profiles such that when the first use profile is selected, the audible message is indicative of the mixed signal, and when the second use profile is selected, the audible message is indicative only of the further signal.

13. A communications device for receiving an incoming communication event from a calling party having an identity, said device comprising:
    a synthesizing module for providing a synthesized waveform signal indicative of the identity of the calling party;
    a combining module, responsive to the synthesized waveform signal, for providing a mixed signal including the waveform signal and a further waveform signal indicative of one or more musical notes; and
    a sound producing module, responsive to a mixed signal, for producing an audible message indicative of the synthesized waveform signal and the further waveform signal upon receiving the incoming communication.

14. The communications device of claim 13, wherein the synthesized waveform signal comprises a text-to-speech message.

15. The communications device of claim 13, wherein the combining module comprises a musical-instrument digital interface (MIDI) protocol for producing the further waveform signal.

16. The communications device of claim 14, wherein the combining module comprises a MIDI protocol for producing the further waveform signal indicative of the musical notes in a beginning note sequence prior to the text-to-speech message.

17. The communications device of claim 16, wherein the further waveform signal further comprises one or more musical notes as an end note sequence.

18. The communications device of claim 13, wherein the mixed signal has a format, and the communications device further comprises a plurality of control parameters to define the format.

19. The communications device of claim 16, wherein the control parameters comprise a beginning sequence time to define the length over which the musical notes in the beginning note sequence are played prior to the text-to-speech message.

20. The communications device of claim 16, wherein the control parameters comprise an end sequence time to define the length over which the musical notes in the end note sequence are played after the text-to-speech message.

21. The communications device of claim 16, wherein the control parameters comprise a petition time to control the number of times the text-to-speech message is played.

22. The communications device of claim 13, comprises a mobile terminal.

23. The communications device of claim 13, further comprising a first use profile mode and a second use profile mode to allow a user of the communication device to select one of the first and second modes such that
when the first use profile mode is selected, the audible message is indicative of the synthesized waveform signal and the further waveform signal, and
when the second use profile mode is selected, the sound producing module produces only an audible ringing tone.

24. A software product for use in a communications device, wherein the communications device is capable of receiving an incoming communication event from a calling party having an identity and wherein the communications device comprises:
a database; and
a sound producing device, said software product comprising:
a first code, responsive to the incoming communication event, for finding the identity of the calling party in the database; and
a second code for combining a first waveform signal indicative of one or more musical notes and a second waveform signal indicative of the identity of the calling party for providing a mixed signal so as to allow the sound producing device to produce an audible message based on the mixed signal to inform a user of the communications device regarding the caller's identity, if the identity is found in the database.

25. The software product of claim 24, wherein the communications device comprises a ringing tone database, said software product further comprising:
a third code for providing the first waveform signal based on a ringing tone format in the ringing tone database.

26. The software product of claim 25, further comprising:
a fourth code for providing the second waveform signal based on the identity of the calling party found in the database.

27. The software product of claim 25, wherein the sound producing device produces a different audible message based on the first waveform if the first code fails to find the identity of the calling party in the database.

* * * * *